UNITED STATES PATENT OFFICE.

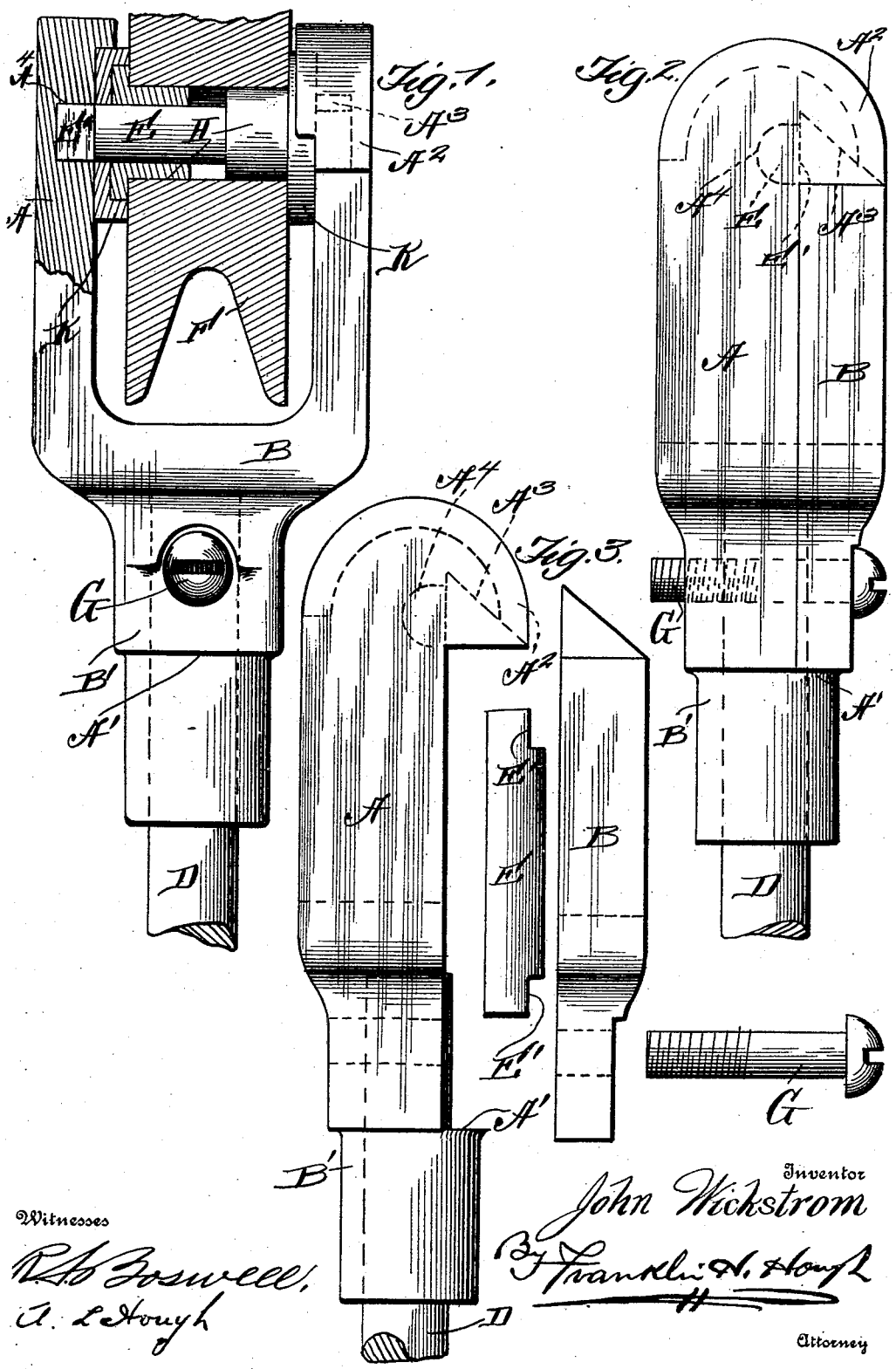

JOHN WICKSTROM, OF WARREN, PENNSYLVANIA.

TROLLEY-HARP.

No. 908,719.      Specification of Letters Patent.      Patented Jan. 5, 1909.

Application filed July 6, 1908. Serial No. 442,120.

*To all whom it may concern:*

Be it known that I, JOHN WICKSTROM, a citizen of the United States, residing at Warren, in the county of Warren and State of Pennsylvania, have invented certain new and useful Improvements in Trolley-Harps; and I do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in trolley harps and the object in view is to produce a simple and efficient device of this nature comprising various details of construction, combinations and arrangements of parts which will be hereinafter fully described and then specifically defined in the appended claims.

I illustrate my invention in the accompanying drawings, in which:—

Figure 1 is a side elevation showing the trolley harp made in accordance with my invention. Fig. 2 is an edge view, and Fig. 3 is detailed views of the parts disassembled.

Reference now being had to the details of the drawings by letter, A and B designate two plates, preferably of cast metal, one of said plates having an integral bushing or shank portion B' for the reception of a trolley pole D. The plate A has a shoulder A' upon which the plate B rests and the upper part of the plate A has an over-hanging part $A^2$ with its downwardly extending end provided with an inclined edge $A^3$ adapted to form a dove-tail connection with the upper inclined end of the part B. The upper portion of the part A has a semi-cylindrical recess $A^4$ formed in the wall thereof adapted to receive the pin E upon which the trolley wheel F is journaled. Said pin has flattened portions E' upon its ends which, when the pin is adjusted in place, are adapted to bear against the inner face of the part B and prevent the pin or shaft from rotating. The two plates A and B are held together by means of a screw G passing through registering apertures therein and also through an aperture in the trolley pole, one of said apertures through which said screw passes being provided with threads. Bushings H, made preferably of hardened steel, are mounted upon said pin and are adapted to have a "pressed fit" with the trolley wheel. Suitable washers K are provided for engagement with the bushing and mounted upon the pin, as shown.

In assembling the parts, the trolley wheel mounted upon the pin in the manner shown is placed between the forked arms of the plate A and the ends of the pin seated in the recesses $A^4$ after which the plate B is adjusted in place and held by means of the screw G. By the flat portions of the ends of the pin coming against the inner face of the plate B, said pin will be held securely from turning, the two plates having a dove-tailed connection, thereby securely holding the parts together.

By the provision of a trolley harp made as shown and described, the steel pin and bushings will in no way interfere with the transmission of power and, being case hardened, the wear upon the same is reduced to minimum. Said washers, which are also mounted upon the pin, will serve to prevent wear and act as oil retainers.

What I claim to be new is:—

1. A trolley harp comprising two plates having dove-tailed connection, a wheel supporting pin mounted in recesses in one of said plates and held from rotation by the other plate, as set forth.

2. A trolley harp comprising two plates having dove-tailed connection at their outer ends, means for holding the lower portions of the plates together, one of said plates having recesses, a pin carrying wheel seated in said recesses and prevented from rotation by the other plate, as set forth.

3. A trolley harp comprising two plates having dove-tailed connection at their outer ends, means for holding the lower portions of the plates together, one of said plates having semi-cylindrical recesses in the forked ends thereof, a wheel carrying pin mounted in said recesses and having flattened portions which are flush with the inner face of said recessed plate, said flattened portions of the pin being adapted to be engaged by the inner surface of the other plate, as set forth.

4. A trolley harp comprising two forked plates, a pole upon which said plates are mounted, one of said plates having an overhanging end, the under edge of which is inclined and provided with a semi-cylindrical recess adjacent thereto, the other plate having a tapering end and dove-tailed connection at its upper end with said recessed plate, a screw for holding the lower portions of the plates together, a trolley carrying pin mounted in said recesses and having flattened portions which are flush with the inner face of the recessed plate and adapted to be engaged by the inner face of the plate having a tapered end, as set forth.

5. A trolley harp comprising two plates, one of which is provided with a hollow post receiving part and shouldered, the upper end of said shouldered plate having an overhanging end with a recess adjacent thereto, a second plate having its upper end tapering and engaging said overhanging end of the other plate and resting upon said shoulder, a screw passing through registering apertures in said plate, and a trolley carrying pin mounted in said recesses and held by one of the plates therein, as set forth.

In testimony whereof I hereunto affix my signature in the presence of two witnesses.

JOHN WICKSTROM.

Witnesses:
 ANDREW WICKSTROM,
 WOODBURY JAMES.